(12) United States Patent
Kobayashi

(10) Patent No.: US 11,016,278 B2
(45) Date of Patent: May 25, 2021

(54) REFLECTIVE OBJECTIVE LENS AND OBSERVATION METHOD

(71) Applicant: NANOPHOTON CORPORATION, Osaka (JP)

(72) Inventor: Minoru Kobayashi, Osaka (JP)

(73) Assignee: NANOPHOTON CORPORATION, Osaka (JP)

(*) Notice: Subject to any disclaimer, the term of this patent is extended or adjusted under 35 U.S.C. 154(b) by 138 days.

(21) Appl. No.: 16/331,466

(22) PCT Filed: Aug. 31, 2017

(86) PCT No.: PCT/JP2017/031447
§ 371 (c)(1),
(2) Date: Mar. 7, 2019

(87) PCT Pub. No.: WO2018/047714
PCT Pub. Date: Mar. 15, 2018

(65) Prior Publication Data
US 2019/0219807 A1 Jul. 18, 2019

(30) Foreign Application Priority Data
Sep. 8, 2016 (JP) .............................. JP2016-175412

(51) Int. Cl.
*G02B 21/04* (2006.01)
*G02B 21/00* (2006.01)
(Continued)

(52) U.S. Cl.
CPC ............ *G02B 21/04* (2013.01); *G02B 17/06* (2013.01); *G02B 17/086* (2013.01); *G02B 21/00* (2013.01); *G02B 21/33* (2013.01)

(58) Field of Classification Search
CPC ... G02B 21/04; G02B 17/0856; G02B 17/086
(Continued)

(56) References Cited

U.S. PATENT DOCUMENTS 4,835,380 A * 5/1989 Opheij ............... G02B 17/0808
250/216
5,045,688 A 9/1991 Domenico et al.
(Continued)

FOREIGN PATENT DOCUMENTS

CN 102667572 A 9/2012
CN 105589185 A 5/2016
(Continued)

OTHER PUBLICATIONS

European Patent Office, Extended European Search Report Issued in Application No. 17848654.1, dated Mar. 30, 2020, Germany, 8 pages.
(Continued)

*Primary Examiner* — Darryl J Collins
(74) *Attorney, Agent, or Firm* — McCoy Russell LLP

(57) ABSTRACT

An objective lens according to an aspect of the present disclosure includes a first element having a first surface to a fourth surface and a second element having a first planar surface and a second planar surface and being located on the specimen-side of the first element. The first surface is a transmissive planar surface located on the optical axis, the second surface is a reflective convex surface located on the optical axis, the third surface is a reflective concave surface located on the outer side of the first surface, and the fourth surface is a transmissive planar surface located on the outer side of the second surface. The first planar surface is a transmissive planar surface to be joined to the fourth surface and the second planar surface is a transmissive planar surface parallel to the first planar surface.

12 Claims, 8 Drawing Sheets

(51) Int. Cl.
*G02B 17/06* (2006.01)
*G02B 17/08* (2006.01)
*G02B 21/33* (2006.01)

(58) Field of Classification Search
USPC .................................. 359/656, 726, 727, 728
See application file for complete search history.

(56) References Cited

U.S. PATENT DOCUMENTS

| | | |
|---|---|---|
| 2002/0136144 A1 | 9/2002 | Hatano |
| 2010/0284099 A1* | 11/2010 | Guyer ................ G02B 27/0938 359/858 |
| 2010/0309566 A1 | 12/2010 | DeWitt et al. |
| 2015/0198793 A1 | 7/2015 | Kosanic et al. |

FOREIGN PATENT DOCUMENTS

| | | |
|---|---|---|
| JP | 2000206411 A | 7/2000 |
| JP | 2001174708 A | 6/2001 |
| JP | 2012529075 A | 11/2012 |

OTHER PUBLICATIONS

Miyata, S. et al., "Reflective Objective Lens for Microscope," Journal of Applied Physics, vol. 21, No. 2-3, Dec. 15, 1951, 5 pages. (Submitted with Partial Translation).

Inagawa, H. et al., "Reflecting microscope system with a 0.99 numerical aperture designed for three-dimensional fluorescence imaging of individual molecules at cryogenic temperatures," Scientific Reports, vol. 5, No. 12833, Aug. 4, 2015, 10 pages.

ISA Japan Patent Office, International Search Report Issued in Application No. PCT/JP2017/031447, dated Oct. 24, 2017, WIPO, 3 pages.

* cited by examiner

Fig. 2

(DESIGN WAVELENGTH 266 nm, NA 1.35, FOCAL LENGTH 2.025 mm, ENTRANCE PUPIL DIAMETER 5.4 mm, CENTRAL SHIELDING DIAMETER 2.7 mm, FIELD OF VIEW 19 μm)

| SURFACE NUMBER | RADIUS OF CURVATURE (mm) | SURFACE INTERVAL (mm) | EFFECTIVE DIAMETER (mm) | MATERIAL |
|---|---|---|---|---|
| S0 | ∞ | ∞ | — | AIR |
| S1 | ∞ | 13.94 | 22.8 | SYNTHETIC FUSED SILICA |
| S2* (PUPIL SURFACE, REFLECTIVE SURFACE) | 4.283 | −17.04 | 7.5 | SYNTHETIC FUSED SILICA |
| S3 (REFLECTIVE SURFACE) | 22.5 | 19.75 | 43.8 | SYNTHETIC FUSED SILICA |
| S4 (JOINING SURFACE) | ∞ | 7.26 | 43.8 | SYNTHETIC FUSED SILICA |
| S5 | ∞ | 0.05 | — | LIQUID IMMERSION MEDIUM |
| S6 | ∞ | 0.15 | — | SYNTHETIC FUSED SILICA |
| S7 (FOCAL SURFACE) | ∞ | — | — | — |

ASPHERICAL SURFACE DATA
S2 SURFACE
k=0.131808, A4=3.941953E−04, A6=3.777800E−06, A8=5.570307E−6

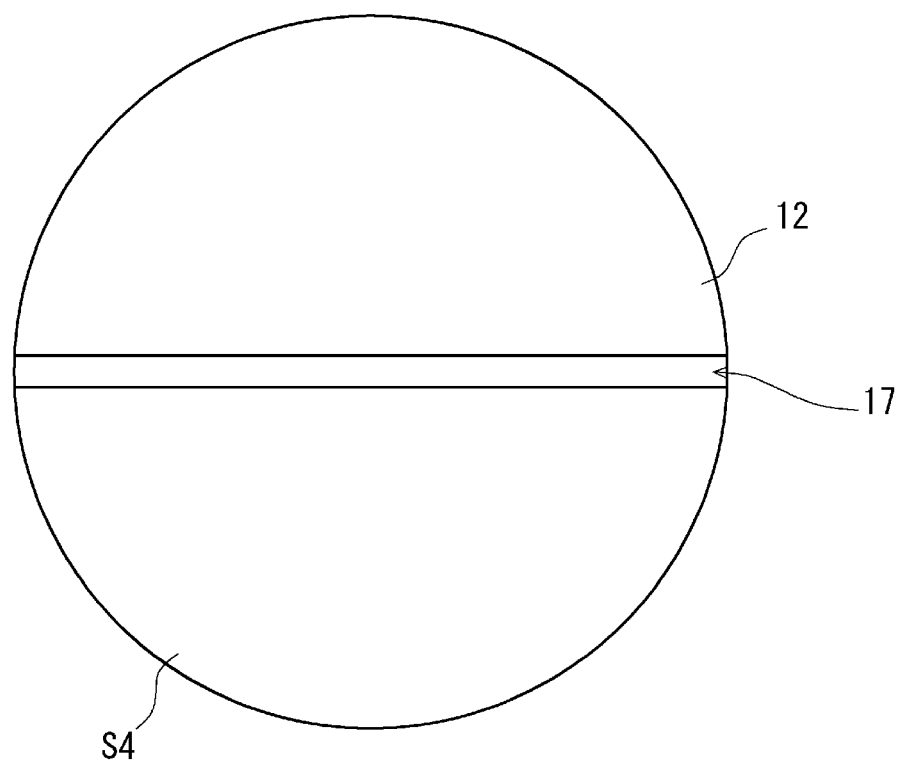
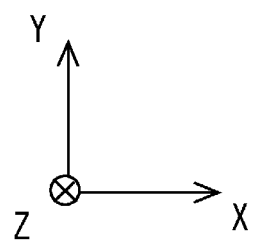
Fig. 5

Fig. 6

(DESIGN WAVELENGTH 266 nm, NA 1.2, FOCAL LENGTH 2.021 mm, ENTRANCE PUPIL DIAMETER 4.8 mm, CENTRAL SHIELDING DIAMETER 2.4 mm, FIELD OF VIEW 39 μm)

| SURFACE NUMBER | RADIUS OF CURVATURE (mm) | SURFACE INTERVAL (mm) | EFFECTIVE DIAMETER (mm) | MATERIAL |
|---|---|---|---|---|
| S0 | ∞ | ∞ | – | AIR |
| S1 | ∞ | 10.200 | 12 | SYNTHETIC FUSED SILICA |
| S2* (PUPIL SURFACE, REFLECTIVE SURFACE) | 4.055 | −11.324 | 5.6 | SYNTHETIC FUSED SILICA |
| S3 (REFLECTIVE SURFACE) | 16.000 | 12.497 | 30 | SYNTHETIC FUSED SILICA |
| S4 (JOINING SURFACE) | ∞ | 7.268 | 30 | SYNTHETIC FUSED SILICA |
| S5 | ∞ | 0.05 | – | LIQUID IMMERSION MEDIUM |
| S6 | ∞ | 0.15 | – | SYNTHETIC FUSED SILICA |
| S7 (FOCAL SURFACE) | ∞ | – | – | – |

ASPHERICAL SURFACE DATA
S2 SURFACE
k=−0.224879, A4=9.161834E−04, A6=2.438324E−05, A8=7.052878E−06

REFLECTIVE OBJECTIVE LENS AND OBSERVATION METHOD

CROSS REFERENCE TO RELATED APPLICATIONS

The present application is a U.S. National Phase of International Patent Application Serial No. PCT/JP2017/031447 entitled "REFLECTIVE OBJECTIVE LENS, AND OBSERVATION METHOD," filed on Aug. 31, 2017. International Patent Application Serial No. PCT/JP2017/031447 claims priority to Japanese Patent Application No. 2016-175412, filed on Sep. 8, 2016. The entire contents of each of the above-mentioned applications are hereby incorporated by reference in their entirety for all purposes.

TECHNICAL FIELD

The present disclosure relates to a reflective objective lens and an observation method using the reflective lens.

BACKGROUND ART

A reflective objective lens that collect light by a reflecting mirror, unlike an objective lens that uses refraction of glass, is free from chromatic aberration and can be used in a wide wavelength ranging from deep ultraviolet to infrared wavelengths. A Schwarzschild-type objective lens which is a kind of reflective objective lens is composed of only two reflecting mirrors, in spite of which it is capable of correcting spherical aberration, comatic aberration, and astigmatism and realizing a relatively high numerical aperture (NA).

The Non Patent Literature 1, the Non Patent Literature 2, and the Patent Literature 1 disclose Schwarzschild-type objective lenses.

CITATION LIST

Patent Literature

United States Patent Publication No. 2015/0198793

Non Patent Literature

[Non Patent Literature 1] Shoichi Miyata, Saburo Yanagawa, "Reflective Objective Lens for Microscope," Applied Physics, Volume 21, Nos. 2-3

[Non Patent Literature 2] H. Inagawa al., "Reflecting microscope system with a 0.99 numerical aperture designed for three-dimensional fluorescence imaging of individual molecules at cryogenic temperatures", Rep. 5, 12833; doi: 10.1038/srep12833 (2015).

SUMMARY OF INVENTION

Technical Problem

The objective lens described in the Non Patent Literature 1 is an objective lens of a liquid-immersion system. According to the Non Patent Literature 1, a plano-convex lens having a spherical surface that has a center at a focal point is added to the end of the objective lens (see FIG. 3 of the Non Patent Literature 1). In this objective lens, since the light traveling toward the focal point on the optical axis perpendicularly enters the spherical surface of the additional plano-convex lens, chromatic aberration on the axis does not occur. Further, the Non Patent Literature 1 discloses a method that uses a fused silica that transmits deep ultraviolet rays as the material for the plano-convex lens and the cover glass and fills the space between the plano-convex lens and the cover glass with glycerin having a refractive index similar to that of the fused silica for microscopic observation in the deep ultraviolet wavelength range.

However, in the objective lens of the Non Patent Literature 1, it is necessary to adjust with high precision the intervals, eccentricities, and inclinations of the three elements of the concave mirror, the convex mirror, and the plano-convex lens constituting the objective lens when the objective lens is to be assembled. As a result, in a case where an objective lens having a high NA is to be produced, a problem arises that the adjustment becomes difficult.

The objective lens of the Non Patent Literature 2 is an objective lens of a liquid-immersion system. A convex mirror and a concave mirror which constitute the objective lens are formed on an inner surface of one fused silica element (FIG. 1(a) of the Non Patent Literature 1). Further, a light incident plane and an exit spherical surface about the focal point are formed on the same fused silica element. In the objective lens of the Non Patent Literature 2, since the light collected on the axis perpendicularly enters the spherical surface, chromatic aberration on the axis does not occur. According to this objective lens, one fused silica element is used and accordingly adjustment of multiple elements relative to each other does not need to be performed.

However, in the objective lens of the Non Patent Literature 2, three non-planar surfaces of the concave mirror, the convex mirror, and the exit spherical surface need to be formed with high precision in one element. In particular, when an objective lens having a high NA is to be produced, a problem arises that it is difficult to form the intervals, eccentricities, and inclinations of these non-planar surfaces with required precision. Also, since the exit spherical surface has a recessed shape with respect to the element, it is necessary to use a large amount of liquid immersion medium to fill the space from the exit spherical surface to the focal point. When the objective lens is to be used in an orientation where the focal point occupies a lower location in the air, another problem arises that it is difficult to fill the space with the liquid immersion medium.

The Patent Literature 1 discloses a reflective objective lens and a manufacturing method thereof (FIG. 4 of the Patent Literature 1). According to this manufacturing method, a platform having Pf1 and Pf2 is formed upon a substrate by performing a spin coating process (FIG. 4(a) of the Patent Literature 1). Next, a carrier material (9) is formed on the Pf2 by the first inkjet printing process. Specifically, in the inkjet printing process, preliminary heating, ultraviolet irradiation, and heating processes are performed after application of photosensitive resin liquid. A coating of an aluminum material is formed on the carrier material (9), and thus the first reflective element (3), which is a convex mirror, is formed (FIG. 4(d) of the Patent Literature 1).

Further, the carrier material (9) is formed on the first reflective element (3) by performing the second inkjet printing process (FIG. 4(e) of the Patent Literature 1). A coating of aluminum material is formed on the carrier material and thus the second reflective element (5), which is a concave mirror, is formed.

In the reflective objective lens of the Patent Literature 1, the carrier material is formed by an inkjet printing process which includes coating, preliminary heating, ultraviolet irradiation, and heating processes. Hence, a problem arises that the concave surface and the convex surface of the carrier material cannot be manufactured with high precision.

The present disclosure has been made in view of the above-described problems and an object of the present disclosure is to provide a reflective objective lens with small manufacturing error and an observation method using the same lens.

Solution to Problem

An objective lens according to an aspect of the present disclosure is a reflective objective lens including a first element having a first surface, a second surface, a third surface, and a fourth surface; and a second element having a first planar surface and a second planar surface and being located on a specimen-side of the first element.

The first surface is a transmissive planar surface located on the optical axis, the second surface is a reflective convex surface located on the optical axis, the third surface is a reflective concave surface located on the outer side of the first surface, the fourth surface is a transmissive planar surface located on the outer side of the second surface, the first planar surface is a transmissive planar surface to be joined to the fourth surface, and the second planar surface is a transmissive planar surface located on a specimen-side of the first planar surface.

According to this feature, it is made possible to achieve an objective lens with small manufacturing error.

In the context of the above-described objective lens, it is preferable that the first planar surface and the second planar surface are parallel to each other.

In the context of the above-described objective lens, it is preferable that the second planar surface is brought into contact with a liquid immersion medium. This feature enables observation with a higher NA.

An objective lens according to an aspect of the present disclosure is an objective lens including a first element having a first surface, a second surface, a third surface, and a fourth surface; and a second element including a first planar surface to be joined to the fourth surface and a facing surface facing the first planar surface, the second element being located on a specimen-side of the first element.

The first surface is a transmissive planar surface located on the optical axis, the second surface is a reflective convex surface located on the optical axis, the third surface is a reflective concave surface located on the outer side of the first surface, the fourth surface is a transmissive planar surface located on the outer side of the second surface, the first planar surface is a transmissive planar surface, and a spherical surface which is a transmissive surface is provided at the central portion of the facing surface.

According to this feature, it is made possible to achieve an objective lens with small manufacturing error.

In the context of the above-described objective lens, the spherical surface may be brought into contact with the liquid immersion medium. This feature enables observation with a higher NA.

In the context of the above-described objective lens, it is preferable that the refractive index of the liquid immersion medium is the same as the refractive indices of the first and second elements. By virtue of this, aberration can be reduced.

In the context of the above-described objective lens, it is preferable that at least either of the second surface and the third surface is an aspherical surface. This feature enables observation with a higher NA.

In the context of the above-described objective lens, it is preferable that the first element and the second element are formed from the same material. By virtue of this, the refractive indices of the first and second elements can be brought into agreement with each other.

In the context of the above-described objective lens, it is preferable that a space is provided between the third surface and the first planar surface.

In the context of the above-described objective lens, a groove or a hole may be formed for connecting the space to the outside.

An observation method according to an aspect of the present disclosure is an observation method using the above-described objective lens. The method includes positioning the objective lens such that the objective lens faces a cover glass covering a specimen and carrying out observation in a state where a space between the objective lens and the cover glass is filled with a liquid immersion medium. This enables observation with a high NA.

In an observation method according to an aspect of the present disclosure, it is preferable that the first element, the second element, the liquid immersion medium, and the cover glass have the same refractive index. By virtue of this, aberration can be reduced.

An observation method according to an aspect of the present disclosure is an observation method using the above-described objective lens. The method includes positioning the objective lens such that the objective lens faces a specimen and carrying out observation in a state where a space between the objective lens and the specimen is filled with a liquid immersion medium. This enables observation with a high NA.

Advantageous Effects of Invention

According to the present disclosure, it is made possible to provide a refractive lens with small manufacturing error and an observation method using the reflective objective lens.

BRIEF DESCRIPTION OF THE DRAWINGS

FIG. 2 is a table illustrating lens data of the reflective objective lens according to the Example 1;

FIG. 5 is a diagram illustrating another configuration facilitating optical contact;

FIG. 6 is a table illustrating lens data of the reflective objective lens according to Example 3;

DESCRIPTION OF EMBODIMENTS

Figure 1:
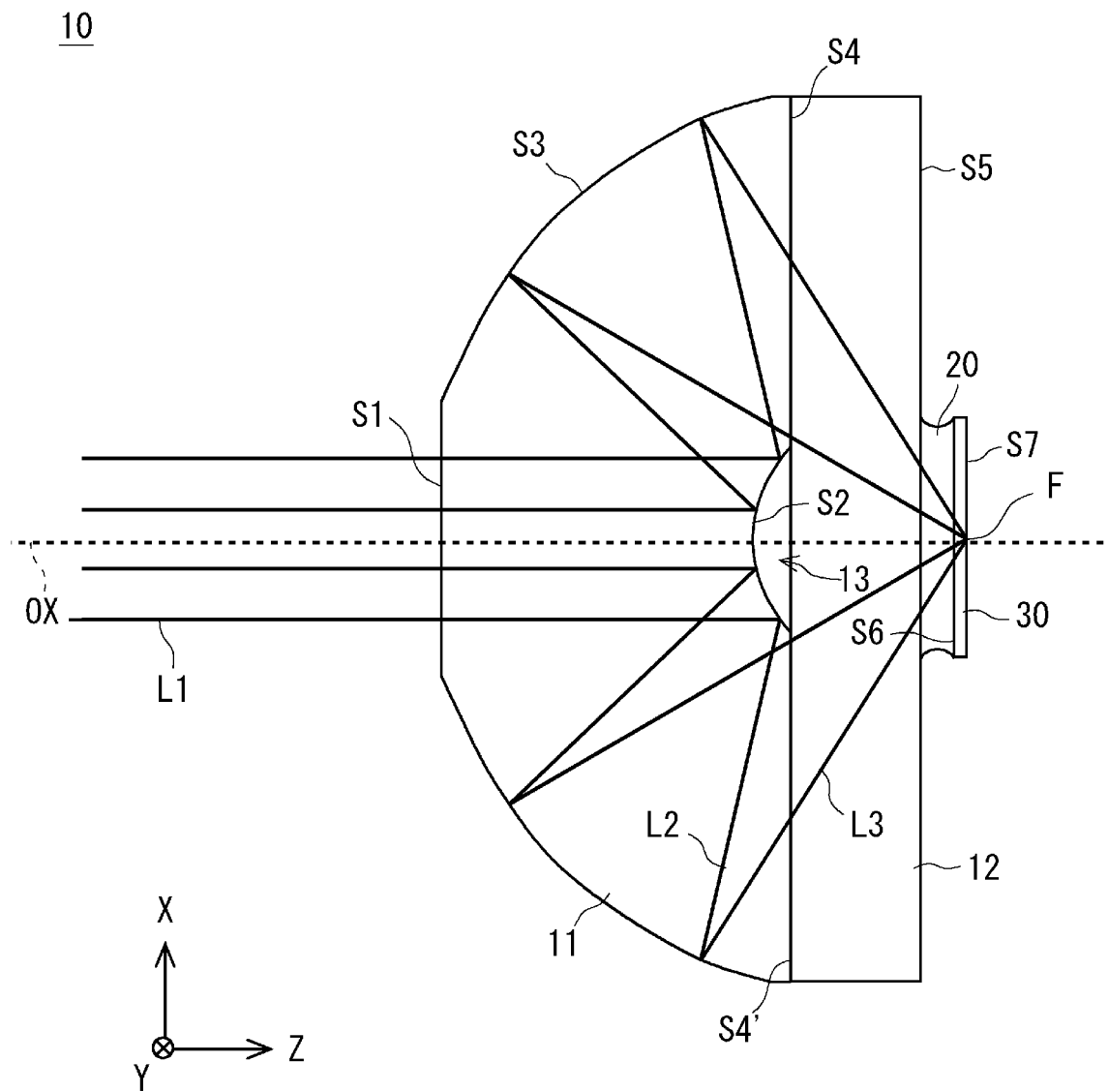
FIG. 1 is a diagram illustrating a reflective objective lens according to this embodiment.

Features of an objective lens according to this embodiment will be described with reference to FIG. 1. FIG. 1 illustrates a cross-sectional view which includes an optical axis OX of an objective lens 10. In the following explanations, terms such as incidence and exit are described in relation to light traveling toward a focal point F. Specifically, illumination light L1 enters the objective lens 10 from the left side in FIG. 1 to illuminate a specimen residing on the right side of the objective lens 10. It will be appreciated that the objective lens 10 according to this embodiment can also be used for applications associated with collecting light from the focal point F (specimen).

The objective lens 10 is a Schwarzschild-type reflective objective lens having two reflecting mirrors. Further, the objective lens 10 is a liquid-immersion objective lens which uses a liquid immersion medium 20. It should be noted that FIG. 1 depicts a three-dimensional XYZ Cartesian coordinate system for clarity of the explanations. In the three-dimensional XYZ Cartesian coordinate system, a Z-axis extends in parallel with the optical axis OX of the objective lens 10 and an XY plane defines a plane perpendicular to the optical axis OX. In normal cases, the objective lens 10 is located above the specimen such that the −Z side becomes the upper side.

The objective lens 10 is an infinite-system objective lens and includes a first element 11 and a second element 12. The first element 11 and the second element 12 are transparent synthetic fused silica elements. The first element 11 includes a first surface S1, a second surface S2, a third surface S3, and a fourth surface S4. The first surface S1 and the third surface S3 define an interface on the −Z side of the first element 11 and the second surface S2 and the fourth surface S4 define an interface on the +Z side.

The first surface S1 is a transmissive planar surface located on the optical axis OX. The first surface S1 is located on an incidence side of the illumination light L1 (−Z side) and is parallel to the XY plane. For example, the first surface S1 has a circular shape on the XY plane. The illumination light L1 enters the inside of the first element 11 via the first surface S1.

The second surface S2 is a reflective convex surface located on the optical axis OX. The second surface S2 reflects the illumination light entering the first element 11 from the first surface S1 toward the third surface S3. FIG. 1 depicts the illumination light reflected by the second surface S2 as illumination light L2. The second surface S2 is located such that it faces the first surface S1 and functions as a convex mirror. The second surface S2 has convex shape that is the −Z side most on the optical axis OX and with its surface toward the +Z side as going away from the optical axis OX. In the third surface S3, for example, a reflective coating such as a metallic coating is formed on the synthetic fused silica element.

The third surface S3 is a reflective concave surface located on the outer side of the first surface S1. The third surface S3 reflects the illumination light L2 reflected by the second surface S2 toward the fourth surface. FIG. 1 depicts the illumination light reflected by the third surface S3 as illumination light L3. The third surface S3 functions as concave mirror having a hole and a hollow portion corresponding to the first surface S1. In the fourth surface S4, for example, a reflective coating such as a metallic coating is formed on the synthetic fused silica element.

Specifically, the third surface S3 is a concave surface extending continuously from the first surface S1. That is, the third surface S3 extends outward from the circular outer circumference of the first surface S1. The positions in the Z direction of the first surface S1 and the third surface S3 coincide with each other at the boundary of the first surface S1 and the third surface S3. In addition, the third surface S3 is positioned closer to the +Z side in proportion to the distance from the optical axis OX on the XY plane.

The fourth surface S4 is a transmissive planar surface located on the outer side of the second surface S2. The illumination light L3 reflected by the third surface S3 passes the fourth surface S4. The fourth surface S4 is parallel to the XY plane. The fourth surface S4 has a hollow portion including the optical axis OX and the second surface S2 is located in this hollow portion.

Specifically, the fourth surface S4 is a planar surface extending continuously from the second surface S2. That is, the fourth surface S4 extends outward from the circular outer circumference of the second surface S2. The positions in the Z direction of the fourth surface S4 and the second surface S2 coincide with each other at the boundary of the fourth surface S4 and the second surface S2.

The second element 12 is a parallel flat plate located on the specimen-side (+Z side) of the first element 11. Accordingly, the second element 12 includes a first planar surface S4' and a second planar surface S5. The first planar surface S4' and the second planar surface S5 are transmissive planar surfaces parallel to the XY plane. The first planar surface S4' and the second planar surface S5 are flat planes without irregularities.

The fourth surface S4 of the first element 11 and the first planar surface S4' of the second element 12 define a joining surface between the first element 11 and the second element 12. That is, the objective lens 10 is produced by joining the fourth surface S4 of the first element 11 and the first planar surface S4' of the second element 12 to each other. The fourth surface S4 and the first planar surface S4' reside substantially on the same XY plane. Meanwhile, an adhesive for optical element or the like for the joining may reside between the fourth surface S4 and the first planar surface S4'.

Since the second surface S2 is a convex surface raised from the fourth surface S4 toward the −Z side, a space 13 is provided between the second surface S2 and the first planar surface S4'. The space 13 is a space enclosed by the third surface S3 and the first planar surface S4'. The space 13 is located on the opposite side of a reflective surface of the second surface S2. The space 13 resides at the central portion including the optical axis OX of the objective lens 10 on the XY plane.

Further, a cover glass 30 which is a parallel flat plate is located on the second planar surface S5 such that the cover glass 30 faces the second planar surface S5. The cover glass 30 includes a third planar surface S6 and a fourth planar surface S7. The third planar surface S6 and the fourth planar surface S7 are parallel to the XY plane. The third planar surface S6 is located on the side of the second element 12 and the fourth planar surface S7 is located on the specimen-side. The space between the third planar surface S6 of the cover glass 30 and the second planar surface S5 of the second element 12 is filled with the liquid immersion medium 20. The fourth planar surface S7 defines the plane of focus on which the focal point F is made.

The first element 11 and the second element 12 are made from transparent materials having the same refractive index. For example, the same material such as synthetic fused silica is used to make the first element 11 and the second element 12. It is preferable that materials having substantially the same refractive index as the refractive indices of the first element 11 and the second element 12 in the wavelength range in use are used to make the cover glass 30 and the liquid immersion medium 20. It will be appreciated that the refractive indices of the liquid immersion medium 20 and the cover glass 30 may differ from the refractive indices of the first element 11 and the second element 12 as long as the difference in the refractive indices is so small that the performance is not compromised. It is also possible to correct the aberration caused by the difference in the refractive indices using a tube lens to be used in conjunction with the objective lens 10.

The cover glass 30 may be made from the same material as those of the first element 11 and the second element 12. When the same material is to be used, the refractive index of the cover glass 30 is in agreement with the refractive indices of the first element 11 and the second element 12. Given this configuration, the light reflected by the third surface S3 will reach the focal point F on the fourth planar surface S7 with substantially no refraction by the fourth surface S4, the second planar surface S5, and the third planar surface S6. Hence, occurrence of the chromatic aberration can be suppressed.

The objective lens 10 may be used without the cover glass 30. In this case, the space from the second planar surface S5 to the specimen is filled with the liquid immersion medium 20. The second planar surface S5 is brought into contact with the liquid immersion medium 20. Since the objective lens 10 is designed such that the light is hardly refracted by the third planar surface S6 even when the cover glass is used, the objective lens of the same design can be used regardless of presence or absence of the cover glass.

The objective lens 10 is a Schwarzschild-type reflective objective lens having two reflecting mirrors (the second surface S2 and the third surface S3). As a result, when the objective lens 10 is used, it is made possible to achieve microscopic observation with a high NA. Further, the space between the cover glass 30 and the objective lens 10 is filled with the liquid immersion medium 20 whose refractive index is larger than that of the air. Hence, it is made possible to achieve observation with a high NA.

The objective lens 10 includes only two non-planar surfaces, i.e., the second surface S2 and the third surface S3. Since it suffices that two non-planar surfaces (the second surface S2 and the third surface S3) are formed on the first element 11, production will be facilitated when compared with the Non Patent Literature 2 where three non-planar surfaces are formed. Also, the second element 12 and the cover glass 30 are an element whose two opposed surfaces are parallel planar surfaces. As a result, the second element 12 and the cover glass 30 can be readily produced. By virtue of this, the manufacturing error of the objective lens 10 can be made small.

When the objective lens 10 is produced, first, the first element 11 and the second element 12 are prepared. For example, the first element 11 and the second element 12 are produced by shaping and lens processing. In addition, the fourth surface S4 of the first element 11 and the first planar surface S4' of the second element 12 are joined to each other. By this process, the objective lens 10 can be manufactured with high precision.

Also, the joining surface (S4, S4') of the first element 11 and the second element 12 defines a planar surface without irregularities. Hence, adjustment of eccentricity, inclination, and the like does not need to be performed when the first element 11 and the second element 12 are joined to each other to assemble the objective lens 10. Also, since the interval from the first surface S1 to the second planar surface S5 is determined at the time of the production of the first element 11 and the second element 12, the surface interval does not need to be adjusted at the time of assembly. By virtue of this, the objective lens 10 can be produced with high precision.

Also, by using the objective lens 10 according to this embodiment, degradation of performance in relation to off-axis light can be reduced when compared with the objective lens of the Non Patent Literature 1. For example, in the Non Patent Literature 1, the off-axis light fails to perpendicularly enter the spherical surface of the planoconvex lens and causes aberration. Meanwhile, according to the objective lens 10 according to this embodiment, the off-axis light is refracted by the first surface S1. Since the first surface S1 is a planar surface, the off-axis light remains to be a parallel light even after the refraction by the first surface S1 as long as the off-axis light is a parallel light. Hence, the degradation of the performance in relation to the off-axis light can be reduced. In other words, the objective lens 10 is capable of achieving a wider field of view than that of the objective lens of the Non Patent Literature 1.

Also, it is preferable that the objective lens 10 according to this embodiment is designed such that the following expression 1 is satisfied, where NA is the numerical aperture, f is the focal length, and D is the entrance pupil diameter:

$$0.95*(2*f*NA)<D<1.05*(2*f*NA) \qquad (1)$$

The condition expressed by the expression 1 indicates that the error of the sine condition is 5% or less. If the objective lens satisfies the sine condition, then $$D=2*f*NA \qquad (2)$$

For example, the lens data of the objective lens disclosed in the Non Patent Literature 2 does not satisfy the condition of the expression (1). As a result, the objective lens of the Non Patent Literature 2 exhibit rapid degradation of performance in relation to the off-axis light, so that the field of view only in the order of 1 micrometers can be obtained. In contrast, by designing the objective lens 10 such that it satisfies the expression (1), the degradation of performance in relation to the off-axis light can be mitigated. Hence, the field of view can be widened. According to the objective lens 10 of this Example 1, for example, the field of view in the order of 19 micrometers can be achieved. According to this embodiment, it is made possible to implement the objective lens 10 whose performance is higher than that described in the Non Patent Literature 2.

The interval between the third planar surface S6 and the fourth planar surface S7 can be adjusted in use such that the focal point is made on the fourth planar surface S7 of the cover glass 30. By this adjustment, the focal point can be made on the fourth planar surface S7 even when manufacturing error is found in the thickness of the cover glass 30.

Also, since the first element 11 and the second element 12 are joined to each other, the space 13 is provided between the first element 11 and the second element 12. By virtue of this, the manufacturing error can be made small. That is, accordingly, unlike the Patent Literature 1, an inkjet printing process is not used, so that a carrier material as located in the Patent Literature 1 is not located in the space 13 enclosed by the third surface S3 and the first planar surface S4'. Hence, the convex surface and the concave surface can be produced with high precision. For example, the first element 11 and the second element 12 are manufactured by shaping and lens processing. In addition, the fourth surface S4 of the first element 11 and the first planar surface S4' of the second element 12 are joined to each other and thus the objective lens 10 can be manufactured. It should be noted that the space 13 may be filled with resin or the same material as that of the first element 11 which is shaped so as to conform to the shape of the space 13.

Since the second planar surface S5 and the third planar surface S6 between which the liquid immersion medium 20 is sandwiched are planar surfaces, the space between the cover glass 30 and the objective lens 10 can be readily filled with the liquid immersion medium 20. For example, even when the objective lens 10 is located above the specimen, the space between the second planar surface S5 and the third planar surface S6 can be reliably filled with the liquid immersion medium 20. Hence, observation with a high NA can be performed.

Both of the second surface S2 and the third surface S3 can be provided as a spherical surface. Alternatively, either of the second surface S2 and the third surface S3 may be provided as a spherical surface and the other of them may be provided as an aspherical surface. Further, both of the second surface S2 and the third surface S3 may be provided as an aspherical surface. By providing at least either of the second surface S2 and the third surface S3 as an aspherical surface, the NA can be made higher than in a case where both of them are provided as a spherical surface.

Since the light collected off the axis is refracted by the first surface S1, chromatic aberration occurs. The chromatic aberration can be corrected by a tube lens used in conjunction with the objective lens 10.

The observation method according to this embodiment is an observation method using the above-described objective lens 10. The objective lens 10 is located such that it faces the cover glass 30 covering the specimen. In addition, observation is conducted in a state where the space between the objective lens 10 and the cover glass 30 is filled with the liquid immersion medium 20. By this process, it is made possible to conduct observation with high NA and improve the resolution of the microscope.

Example 1

The lens data of the objective lens 10 according to the Example 1 is shown in FIG. 2. The third surface S3 is a spherical surface and the second surface S2 is an aspherical surface. It should be noted that the surface interval indicates the Z-axis distance on the OX axis from one surface of the surface number indicated to the surface of the next surface number. Also, since the third surface S3 does not reside on the optical axis OX, the surface interval of the surfaces indicated by the surface numbers S2 and S3 indicates the distance from the position on the Z-axis of a virtual spherical surface corresponding to the third surface S3.

Also, FIG. 2 shows the aspherical surface data of the second surface S2. If the z-axis extends in the direction of the optical axis, the r-axis extends in the direction perpendicular to the optical axis, and the positive side is indicated by the direction toward the focal point F along the optical axis, then the aspherical surface shape is expressed by the following expression (3). Here, the units of the Z and r are mm.

[Math 1]

If the wavelength range in use is specified as the ultraviolet region of 200 nm to 400 nm, then synthetic fused silica through which lights in this region are allowed to be transmitted (for example, SUPRASIL-P248 manufactured by Shin-Etsu Quartz Products Co., Ltd.) can be used as the materials for the first element 11, the second element 12, and the cover glass 30. The materials of the first element 11, the second element 12, and the cover glass 30 can be changed to an optical material that transmits light in the wavelength range in use regardless of the refractive index. In other words, even when the material should be changed, it is not necessary to change the radius of curvature, the surface interval, and the effective diameter of the lens data.

Figure 3:
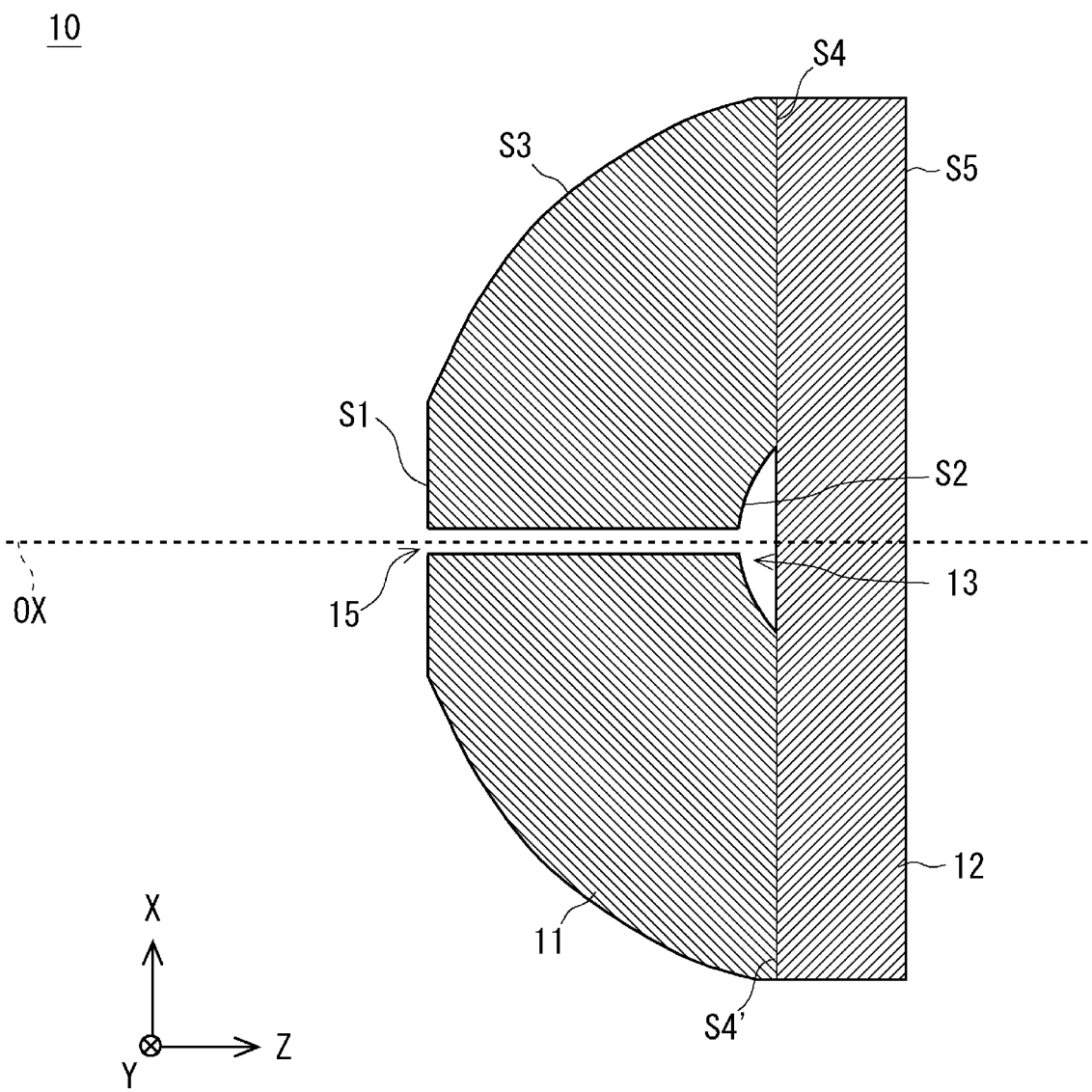
FIG. 3 is a cross-sectional view illustrating a configuration facilitating optical contact.

A method based on optical contact can be used in joining the first element 11 and the second element 12 to each other. In order to facilitate optical contact, a hole 15 may be provided which extends from the first surface S1 to the central shielding portion of the second surface S2 as illustrated in FIG. 3. The hole 15 extends through the first element 11 and is located on the optical axis OX. The hole 15 extends from the first surface S1 until it reaches the second surface S2. Accordingly, the hole 15 is located along the optical axis OX in communication with the space 13. Alternatively, the first element 11 and the second element 12 may be joined to each other by using a joining method which radiates ultraviolet light after application of silicone liquid. The joining method which radiates ultraviolet light after application of silicone liquid is described, for example, in Japanese Patent No. 4532371.

Figure 4:
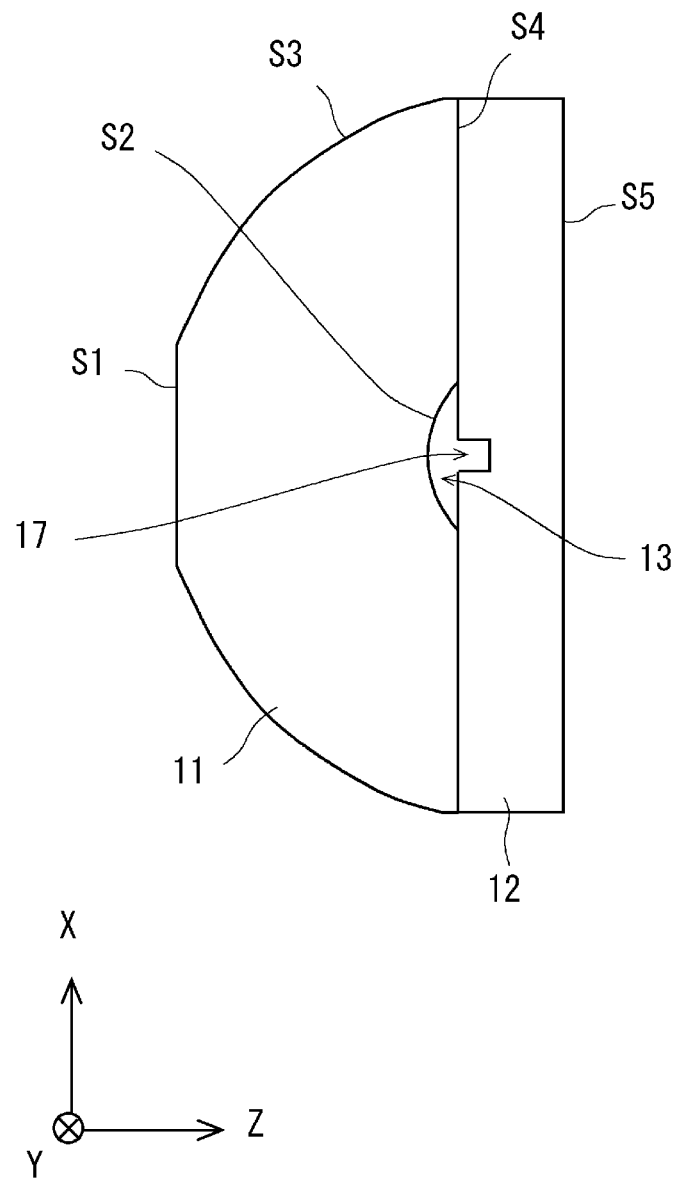
FIG. 4 is a diagram illustrating another configuration facilitating optical contact.

FIGS. 4 and 5 illustrate another structure for facilitating optical contact. FIG. 4 is a cross-sectional view that illustrates the configuration of the objective lens 10 and FIG. 5 is a plan view that illustrates the first planar surface S4' of the second element 12. In the objective lens 10 of FIGS. 4 and 5, a groove 17 is provided in the first planar surface S4' of the second element 12. That is, the first planar surface S4' of the second element 12 is formed such that part of it is recessed, and thereby the groove 17 is provided in the first planar surface S4'. The groove 17 is provided in the X direction. The groove 17 extends from an end of the first planar surface S4', through the center of it, and to the other end of it such that it is in communication with the space 13. When the groove 17 is provided, the space 13 is allowed to be connected to an external space. It should be noted that the example illustrated in FIG. 5 indicates the groove 17 provided in the X direction, but the orientation and number of the groove 17 are not limited to particular ones. For example, three grooves extending radially from the center may be provided.

Alternatively, a liquid immersion medium may be applied to the space between the fourth surface S4 and the first planar surface S4' to retain the surfaces to each other in an intimate contact with each other. For example, the second surface S2 and the third surface S3 can be provided as reflective surfaces, for example, by depositing aluminum thereon. Alternatively, the second surface S2 and the third surface S3 may be provided as reflective surfaces by forming a dielectric multilayer coating thereon.

When synthetic fused silica is used as the materials of the first element 11, the second element 12, and the cover glass 30, then mixture of glycerin and water can be used as the liquid immersion medium 20. Glycerin has a higher refractive index than that of synthetic fused silica while water has a lower refractive index than the synthetic fused silica. As a result, adjustment of the mixture ratio of glycerin and water makes it possible to prepare the liquid immersion medium 20 having the same refractive index as that of the synthetic fused silica in a particular wavelength. When the mixture of glycerin and water that has been adjusted and prepared in this manner is to be used, the performance of diffraction limit can be obtained by the objective lens 10 as one single lens in the wavelength range of at least 5 nm above and below the wavelength in agreement.

Alternatively, linear or cyclic hydrocarbon or any mixture thereof can be used as the liquid immersion medium 20. When a mixture is to be used, then a material having a higher refractive index than that of the synthetic fused silica and a material having a lower refractive index in the wavelength range in use than that should be used. For example, when the wavelength range in use is 250 nm to 320 nm, then cyclodecane, cyclooctane, and the like may be mentioned as the high refractive index material, and hexadecane, pentadecane, tetradecane, and the like may be mentioned as a low refractive index material. In addition, when the high refractive index material and the low refractive index material are mixed with each other. By this process, it is made possible to prepare the liquid immersion medium 20 whose refractive index is in agreement with the refractive index of the synthetic fused silica in a particular wavelength.

The material to be selected for the liquid immersion medium 20 needs to be liquid at the temperature at which the medium is used. At this point, when hydrocarbons with the least possible volatility are selected as the material, change in the refractive index due to volatilization can be prevented. The hydrocarbon mentioned here as an example satisfies these conditions at room temperature. When a hydrocarbon-based mixture is to be used, different than the case where a mixture of glycerin and water is used, there is no risk of change in the refractive index due to moisture absorption of water in the air by the liquid immersion medium 20.

Example 2

The objective lens of the Example 1 can be used in the visible light region of 400 nm to 700 nm with modifications made to part of it. In use in the visible light region, the joining of the first element 11 and the second element 12 may be made using a method that uses an adhesive for an optical element as well as the method described in the Example 1.

The second surface S2 and the third surface S3 can be provided as a reflective surface by aluminum vapor deposition in the same or similar manner as in the Example 1. In addition, the reflective surface may be obtained by vapor deposition of silver having a higher reflectance than that of aluminum in the visible light region. A mixture of glycerin and water adjusted such that the refractive index is in agreement with that of the synthetic fused silica can be used as the liquid immersion medium in the same or similar manner as in the Example 1. In addition to this, a commercially available liquid immersion medium (e.g., 50350 manufactured by Cargille Laboratories) adjusted such that the refractive index is in agreement with that of the synthetic fused silica in the visible light region can also be used. The materials of the first element 11 and the second element 12 can be changed to optical glass such as BK7 that transmits visible light. At this point, the liquid immersion medium is changed to the one whose refractive index is in agreement with that of the optical glass in use.

Example 3

The lens data of the objective lens 10 according to the Example 3 is shown in FIG. 6. In data of the Example 3, the lens is designed with the NA set to 1.2. According to this Example 3, the error sensitivity is small when compared with the data of the Example 1 and manufacturing is facilitated. It can also be used in the visible light region with modifications made thereto in the same or similar manner as in the second embodiment.

First Modified Example

Figure 7:
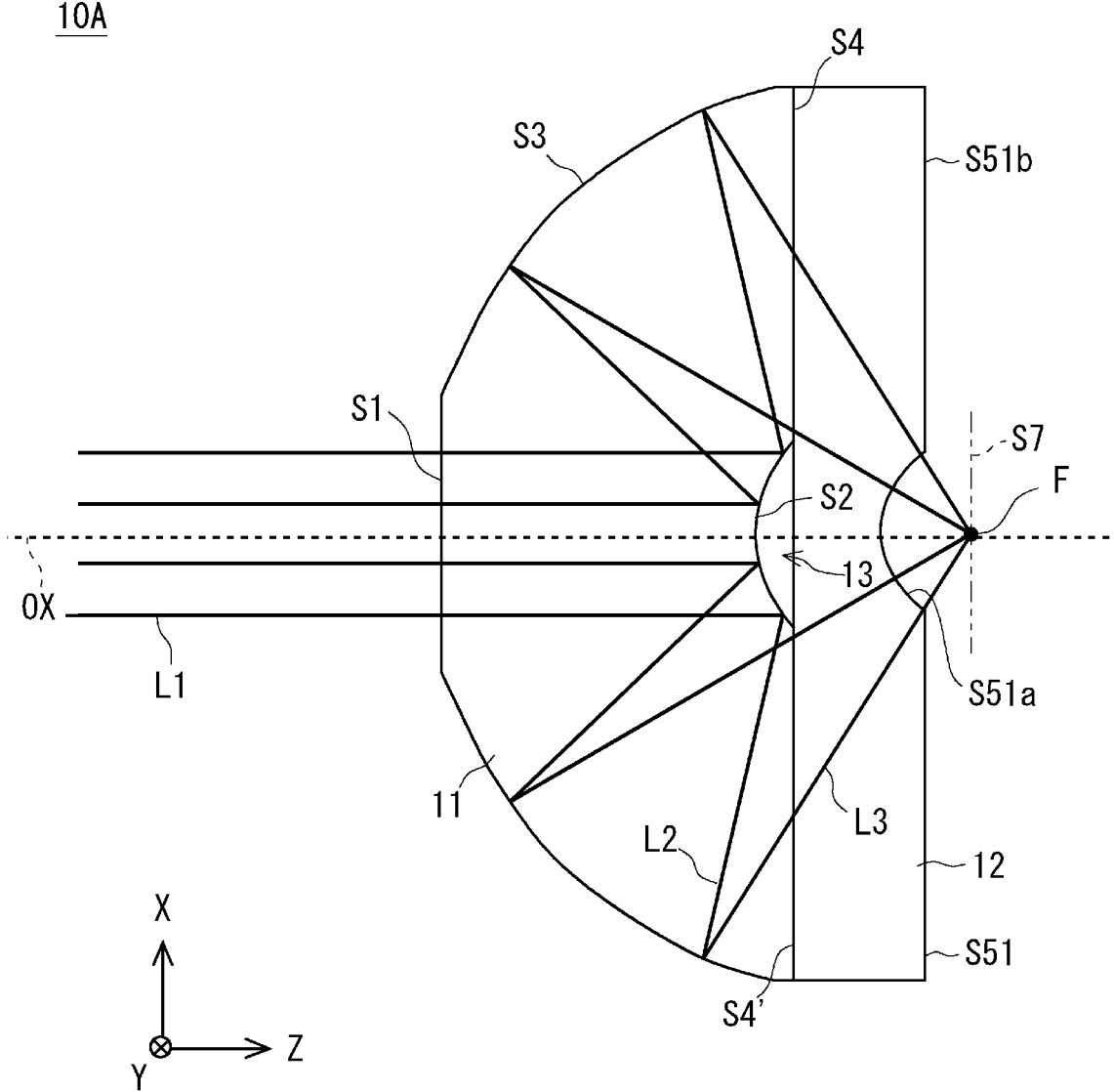
FIG. 7 is a diagram illustrating a configuration of a reflective objective lens according to a first modified example.
Figure 8:
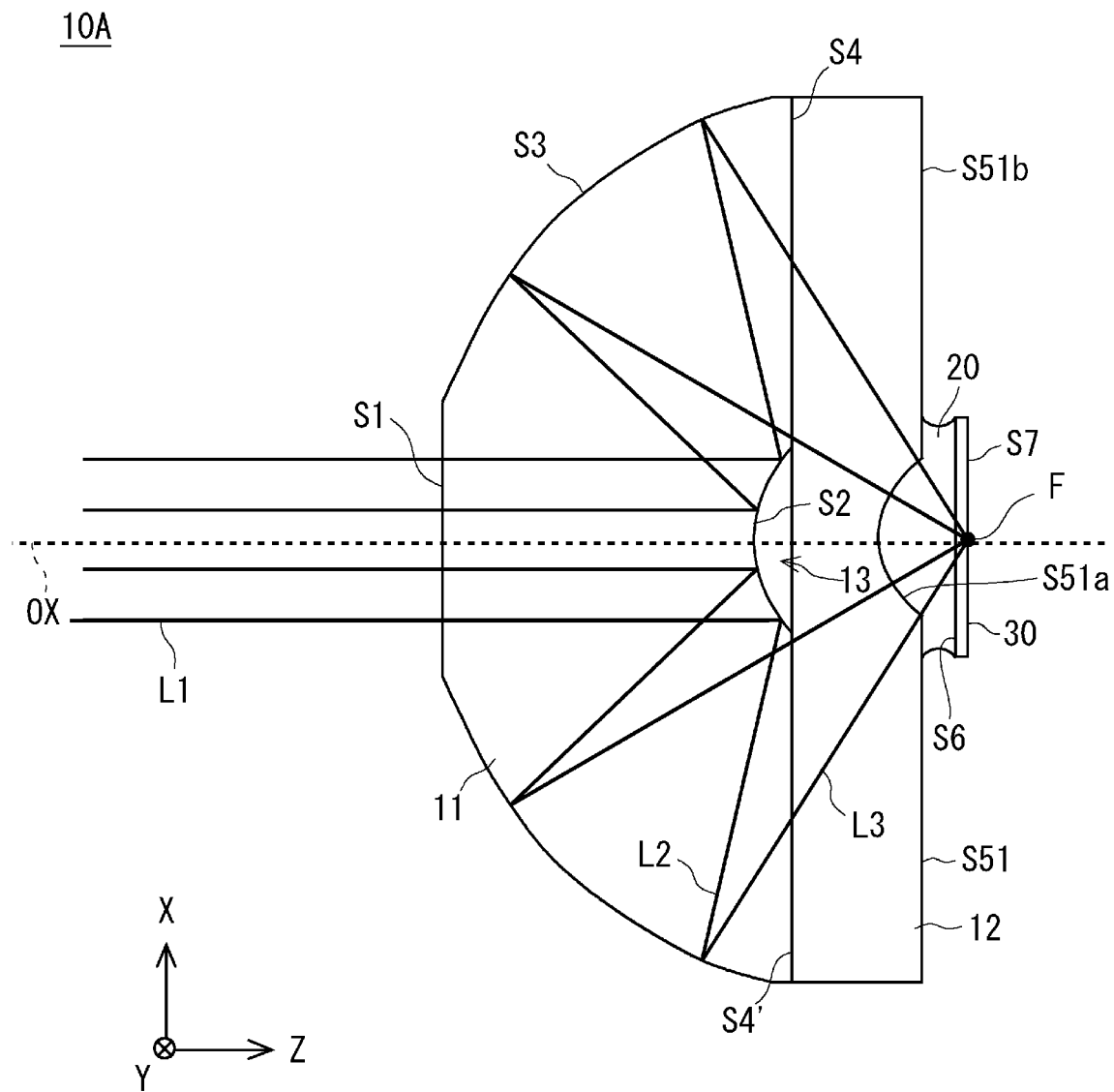
FIG. 8 is a diagram illustrating a configuration of a reflective objective lens according to the first modified example.

A modified example of the objective lens 10A is illustrated in FIGS. 7 and 8. FIGS. 7 and 8 are diagrams that illustrate the objective lens 10A according to the first modified example. FIG. 7 illustrates a configuration where the objective lens 10A is used as a dry objective lens while FIG. 8 illustrates a configuration where the objective lens 10A is used as a liquid-immersion objective lens. The first modified example can be used in both of the case where one objective lens 10A is used as a dry objective lens and the case where it is used as a liquid-immersion objective lens.

While the second planar surface S5 in FIG. 1 defines a planar surface including the central portion, part of the surface S51 facing the first planar surface S4' of the second element 12 in the first modified example defines a spherical surface S51a. It should be noted that the features other than the surface S51 are the same as or similar to those of FIG. 1 and accordingly explanations thereof 1 are not repeated.

The spherical surface S51a is a spherical surface with its center at the focal point on the optical axis OX. The spherical surface S51a is provided at the central portion of the planar surface S51b (the portion including the optical axis). The spherical surface S51a defines a concave surface located at the central portion of the surface S51. The spherical surface S51a is a transmissive surface whose center of curvature is the focal point on the specimen-side. Accordingly, the surface S51 on the specimen-side of the second element 12 is constituted by a spherical surface S51a located on the optical axis OX and a planar surface S51b located around the spherical surface S51a. The central portion of the planar surface S51b is recessed and thereby the spherical surface S51a is formed.

As illustrated in FIG. 7, the objective lens 10 can also be used as a dry objective lens that does not use the liquid immersion medium or the cover glass. The spherical surface S51a is a spherical surface with the focal point on the optical axis being its center, and the light traveling toward the focal point on the optical axis perpendicularly enters the spherical surface, so that it is not refracted by the spherical surface S51a and the chromatic aberration on the axis does not occur.

When the objective lens 10A is used as the liquid-immersion objective lens as illustrated in FIG. 8, the cover glass 30 is located such that it faces the surface S51 of the specimen-side of the second element 12. In addition, the space between the spherical surface S51a of the second element 12 and the third planar surface S6 of the cover glass 30 is filled with a liquid immersion medium whose refractive index is equal to the refractive index of the second element. At this point, the refraction by the spherical surface S51a does not occur. As a result, the objective lens will have the same imaging characteristic as that in the case where the surface S51 is provided as a planar surface.

When the spherical surface S51a is provided on the surface S51 facing the first planar surface S41', the necessary amount of the liquid immersion medium increases, and yet the amount of the liquid immersion medium is smaller than that in the objective lens of the Non Patent Literature 2. In order to reduce the necessary amount of the liquid immersion medium, the radius of curvature of the spherical surface S51a should be made smaller to the extent possible while the region where the light ray passes is provided. The spherical surface S51a is brought into contact with the liquid immersion medium 20.

It should be noted that the outer side of the spherical surface S51a is provided as the planar surface S51b in FIGS. 7 and 8 but it may not be provided as the planar surface S51b. For example, the outer side of the spherical surface S51a may be provided as a conical surface. Accordingly, the surface S51 may not have the planar surface S51b parallel to the first planar surface S41.

For example, if the first planar surface S4' is defined as a first planar surface to be joined to the fourth surface S4 and the surface S51 is defined as the facing surface that faces the first planar surface, then the objective lens 10 according to this embodiment can also be described as follows.

The objective lens 10A according to this embodiment is a reflective objective lens that includes a first element having a first surface, a second surface, a third surface, and a fourth surface; a second element including a first planar surface to be joined to the fourth surface and a facing surface facing the first planar surface, the second element being located on the specimen-side of the first element, wherein the first surface is a transmissive planar surface located on the optical axis, the second surface is a reflective convex surface located on the optical axis, the third surface is a reflective concave surface located on the outer side of the first surface, the fourth surface is a transmissive planar surface located on the outer side of the second surface, the first planar surface is a transmissive planar surface, and a spherical surface which is a transmissive surface is provided at the central portion of the facing surface.

As illustrated in the first modified example, the surface of the specimen-side (facing surface) of the second element 12 is not limited to a planar surface and may be a conical surface. Accordingly, the objective lens according to this embodiment can also be described as follows.

The objective lens according to this embodiment is a reflective objective lens that includes a first element having a first surface, a second surface, a third surface, and a fourth surface; a second element having a first planar surface to be joined to the fourth surface and a facing surface facing the first planar surface, the second element being located on the specimen-side of the first element, wherein the first surface is a transmissive planar surface located on the optical axis, the second surface is a reflective convex surface located on the optical axis, the third surface is a reflective concave surface located on the outer side of the first surface, the fourth surface is a transmissive planar surface located on the outer side of the second surface, the first planar surface is a transmissive planar surface, and the facing surface is a transmissive surface.

This application claims priority based on Japanese Patent Application No. 2016-175412 filed on Sep. 8, 2016, disclosure of which is incorporated herein in its entirety.

REFERENCE SIGNS LIST

10: objective lens
11: first element
12: second element
13: space
20: liquid immersion medium
30: cover glass
S1: first surface
S2: second surface
S3: third surface
S4: fourth surface
S4': first planar surface
S5: second planar surface
S51: surface
S51a: spherical surface
S51b: planar surface
S6: third planar surface
S7: fourth planar surface

The invention claimed is:

1. A reflective objective lens comprising: a first element having a first surface, a second surface, a third surface, and a fourth surface; and a second element having a first planar surface and a second planar surface and being located on a specimen-side of the first element, wherein the first surface is a transmissive planar surface located on an optical axis, the second surface is a reflective convex surface located on the optical axis, the third surface is a reflective concave surface extending outward from a circular outer circumference of the first surface, the fourth surface is a transmissive planar surface extending outward from a circular outer circumference of the second surface, the first planar surface is a transmissive planar surface to be joined to the fourth surface, and the second planar surface is a transmissive planar surface located on a specimen-side of the first planar surface, wherein a space is provided between the third surface and the first planar surface.

2. The reflective objective lens according to claim 1, wherein the first planar surface and the second planar surface are parallel to each other.

3. The reflective objective lens according to claim 1, wherein at least either of the second surface and the third surface is an aspherical surface.

4. The reflective objective lens according to claim 1, wherein the first element and the second element are formed from the same material.

5. The reflective objective lens according to claim 1, wherein a groove or a hole for connecting the space to an outside is formed.

6. A reflective objective lens comprising:
   a first element having a first surface, a second surface, a third surface, and a fourth surface; and
   a second element having a first planar surface and a second planar surface and being located on a specimen-side of the first element,
   wherein the first surface is a transmissive planar surface located on an optical axis,
   the second surface is a reflective convex surface located on the optical axis,
   the third surface is a reflective concave surface extending outward from a circular outer circumference of the first surface,
   the fourth surface is a transmissive planar surface extending outward from a circular outer circumference of the second surface,
   the first planar surface is a transmissive planar surface to be joined to the fourth surface, and
   the second planar surface is a transmissive planar surface located on a specimen-side of the first planar surface,
   wherein the second planar surface is brought into contact with a liquid immersion medium.

7. The reflective objective lens according to claim 6, wherein a refractive index of the liquid immersion medium is the same as refractive indices of the first element and the second element.

8. An observation method using the objective lens according to claim 6, the method comprising: positioning the objective lens such that the objective lens faces a cover glass covering a specimen; and carrying out observation in a state where a space between the objective lens and the cover glass is filled with a liquid immersion medium.

9. The observation method according to claim 8, wherein the first element, the second element, the liquid immersion medium and the cover glass have the same refractive index.

10. An observation method using the objective lens according to claim 6, the method comprising: positioning the objective lens such that the objective lens faces a specimen; and carrying out observation in a state where a space between the objective lens and the specimen is filled with a liquid immersion medium.

11. A reflective objective lens comprising: a first element having a first surface, a second surface, a third surface, and a fourth surface; and a second element including a first planar surface to be joined to the fourth surface and a facing surface facing the first planar surface, the second element being located on a specimen-side of the first element, wherein the first surface is a transmissive planar surface located on an optical axis, the second surface is a reflective convex surface located on the optical axis, the third surface is a reflective concave surface extending outward from a circular outer circumference of the first surface located on an outside of the first surface, the fourth surface is a transmissive planar surface extending outward from a circular outer circumference of the second surface, the first planar surface is a transmissive planar surface, and a spherical surface is provided at a central portion of the facing surface, the spherical surface is a transmissive surface,
   wherein a space is provided between the third surface and the first planar surface.

12. A reflective objective lens comprising:
   a first element having a first surface, a second surface, a third surface, and a fourth surface; and
   a second element including a first planar surface to be joined to the fourth surface and a facing surface facing the first planar surface, the second element being located on a specimen-side of the first element,
   wherein the first surface is a transmissive planar surface located on an optical axis,
   the second surface is a reflective convex surface located on the optical axis,
   the third surface is a reflective concave surface extending outward from a circular outer circumference of the first surface,
   the fourth surface is a transmissive planar surface extending outward from a circular outer circumference of the second surface,
   the first planar surface is a transmissive planar surface, and
   a spherical surface is provided at a central portion of the facing surface, the spherical surface is a transmissive surface,
   wherein the spherical surface is brought into contact with a liquid immersion medium.

\* \* \* \* \*